US011307352B2

(12) United States Patent
Bhagavatula et al.

(10) Patent No.: US 11,307,352 B2
(45) Date of Patent: Apr. 19, 2022

(54) OPTICAL WAVEGUIDE ARTICLE WITH LAMINATE STRUCTURE AND METHOD FOR FORMING THE SAME

(71) Applicant: CORNING INCORPORATED, Corning, NY (US)

(72) Inventors: Venkata Adiseshaiah Bhagavatula, Big Flats, NY (US); Natesan Venkataraman, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 596 days.

(21) Appl. No.: 16/317,933

(22) PCT Filed: Jul. 11, 2017

(86) PCT No.: PCT/US2017/041439
§ 371 (c)(1),
(2) Date: Jan. 15, 2019

(87) PCT Pub. No.: WO2018/013505
PCT Pub. Date: Jan. 18, 2018

(65) Prior Publication Data
US 2021/0302649 A1 Sep. 30, 2021

Related U.S. Application Data

(60) Provisional application No. 62/362,870, filed on Jul. 15, 2016.

(51) Int. Cl.
*G02B 6/122* (2006.01)
*G02B 6/134* (2006.01)
(52) U.S. Cl.
CPC .......... *G02B 6/122* (2013.01); *G02B 6/1345* (2013.01)

(58) Field of Classification Search
CPC .................................................. G02B 6/1345
See application file for complete search history.

(56) References Cited

U.S. PATENT DOCUMENTS

| | | | |
|---|---|---|---|
| 3,737,294 A | 6/1973 | Dumbaugh et al. |
| 3,746,526 A | 7/1973 | Giffon |
| 3,849,097 A | 11/1974 | MacDowell et al. |
| 3,922,062 A | 11/1975 | Uchida |

(Continued)

FOREIGN PATENT DOCUMENTS

| | | |
|---|---|---|
| AU | 2012225244 A1 | 10/2013 |
| CN | 101218659 A | 7/2008 |

(Continued)

OTHER PUBLICATIONS

Chinese Patent Application No. 201780055575.5, Office Action dated Feb. 1, 2021; 14 pages (8 pages English Translation and 6 pages of Original Document); Chinese Patent Office.

(Continued)

*Primary Examiner* — Sung H Pak

(57) ABSTRACT

An optical waveguide article includes a base layer formed from a first glass composition with a refractive index $n_{base}$ and a surface layer fused to the base layer and formed from a second glass composition with a refractive index $n_{surface}$. A waveguide is disposed within the surface layer. $n_{base}$ and $n_{surface}$ satisfy the equation $|n_{surface}-n_{base}| \geq 0.001$. A method for forming an optical waveguide article includes forming a waveguide in a surface layer of a glass laminate structure including a base layer fused to the surface layer. The base layer is formed from a first glass composition with a refractive index $n_{base}$. The surface layer is formed from a second glass composition with a refractive index $n_{surface}$. $n_{base}$ and $n_{surface}$ satisfy the equation $|n_{surface}-n_{base}| \geq 0.0001$.

19 Claims, 11 Drawing Sheets

(56) References Cited

U.S. PATENT DOCUMENTS

| | | | |
|---|---|---|---|
| 3,931,438 | A | 1/1976 | Beall et al. |
| 4,102,664 | A | 7/1978 | Dumbaugh |
| 4,214,886 | A | 7/1980 | Shay et al. |
| 4,425,146 | A | 1/1984 | Izawa et al. |
| 4,913,717 | A | 4/1990 | Cooper |
| 5,160,360 | A | 11/1992 | Seki et al. |
| 5,160,523 | A | 11/1992 | Honkanen et al. |
| 5,342,426 | A | 8/1994 | Dumbaugh, Jr. |
| 5,378,256 | A | 1/1995 | Green et al. |
| 5,559,060 | A | 9/1996 | Dumbaugh, Jr. et al. |
| 6,067,388 | A | 5/2000 | Fabricius et al. |
| 6,769,274 | B2 | 8/2004 | Cho et al. |
| 6,847,772 | B2 * | 1/2005 | Inoue .................. G02B 6/122 385/129 |
| 7,201,965 | B2 | 4/2007 | Gulati et al. |
| 7,263,247 | B1 | 8/2007 | Hehlen et al. |
| 7,432,649 | B2 | 10/2008 | West |
| 7,514,149 | B2 | 4/2009 | Bocko et al. |
| 7,817,896 | B2 | 10/2010 | Borrelli et al. |
| 8,007,913 | B2 | 8/2011 | Coppola et al. |
| 8,128,271 | B2 | 3/2012 | Nichol |
| 9,002,165 | B2 | 4/2015 | Ichioka et al. |
| 2004/0190848 | A1 * | 9/2004 | Ide .................. G02B 6/132 385/129 |
| 2005/0058423 | A1 | 3/2005 | Brinkmann et al. |
| 2006/0204197 | A1 * | 9/2006 | Miyadera .......... G02B 6/1342 385/129 |
| 2015/0044445 | A1 * | 2/2015 | Garner .............. C03C 23/0025 428/220 |
| 2017/0080688 | A1 | 3/2017 | Borrelli et al. |
| 2017/0282503 | A1 | 10/2017 | Peng et al. |

FOREIGN PATENT DOCUMENTS

| | | |
|---|---|---|
| CN | 202465514 U | 10/2012 |
| CN | 103492919 A | 1/2014 |
| DE | 19936050 A1 | 2/2000 |
| DE | 10322350 A1 | 12/2004 |
| DE | 102008007871 A1 | 8/2008 |
| DE | 202011102663 U1 | 1/2012 |
| EP | 0380468 A2 | 8/1990 |
| EP | 0467579 A2 | 1/1992 |
| EP | 0575157 A1 | 12/1993 |
| EP | 0794443 A2 | 9/1997 |
| EP | 1717613 A1 | 11/2006 |
| FR | 2486250 A1 | 1/1982 |
| JP | 2000081527 A | 3/2000 |
| WO | 03046657 A2 | 6/2003 |
| WO | 2013129400 A1 | 9/2013 |
| WO | 2015/126994 A1 | 8/2015 |
| WO | 2018/013505 A1 | 1/2018 |

OTHER PUBLICATIONS

International Search Report and Written Opinion of the International Searching Authority; PCT/US2017/041439; dated Oct. 11, 2017; 11 Pages; European Patent Office.

Tervonen et al.; "Ion-Exchanged Glass Waveguide Technology: A Review"; Optical Engineering, 50 (7), 071107; Jul. 2011; 16 Pages.

English Translation of CN201780055575.5 Office Action dated Apr. 7, 2020; 13 Pages; Chinese Patent Office.

* cited by examiner

OPTICAL WAVEGUIDE ARTICLE WITH LAMINATE STRUCTURE AND METHOD FOR FORMING THE SAME

This application claims the benefit of priority under 35 U.S.C. § 371 of International Application No. PCT/US2017/041439, filed on Jul. 11, 2017, which claims the benefit of priority to U.S. Provisional Application No. 62/362,870, filed on Jul. 15, 2016, the content of which is incorporated herein by reference in its entirety.

BACKGROUND

1. Field

This disclosure relates to optical waveguides, and more particularly to surface optical waveguides having a laminate structure.

2. Technical Background

An optical waveguide can be configured as a high refractive index material surrounded by a low refractive index material. Light introduced into the waveguide will propagate within the high refractive index material.

An optical waveguide can be produced by starting with an ion-exchangeable glass substrate, masking the surface of the substrate so that the intended path of the waveguide is exposed, and subjecting the masked substrate to an ion-exchange treatment to increase the refractive index of the exposed region, thereby forming the high refractive index material along the intended path.

SUMMARY

Disclosed herein are optical waveguide articles with laminate structures and methods for forming the same.

Disclosed herein is an optical waveguide article comprising a base layer formed from a first glass composition with a refractive index $n_{base}$ and a surface layer fused to the base layer and formed from a second glass composition with a refractive index $n_{surface}$. A waveguide is disposed within the surface layer. $n_{base}$ and $n_{surface}$ satisfy the equation $n_{surface} - n_{base} \geq 0.001$.

Also disclosed herein is an optical waveguide article comprising a laminated glass sheet comprising a base layer and a surface layer fused to the base layer. The base layer is formed from a first glass composition with a refractive index $n_{base}$. The surface layer is formed from a second glass composition with a refractive index $n_{surface}$. $n_{base}$ and $n_{surface}$ satisfy the equation $|n_{surface} - n_{base}| \geq 0.001$. A waveguide is disposed within the surface layer.

Also disclosed herein is a method for forming an optical waveguide article. The method comprises forming a waveguide in a surface layer of a glass laminate structure comprising a base layer fused to the surface layer. The base layer is formed from a first glass composition with a refractive index $n_{base}$. The surface layer is formed from a second glass composition with a refractive index $n_{surface}$. $n_{base}$ and $n_{surface}$ satisfy the equation $|n_{surface} - n_{base}| \geq 0.001$.

It is to be understood that both the foregoing general description and the following detailed description are merely exemplary, and are intended to provide an overview or framework to understanding the nature and character of the claimed subject matter. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
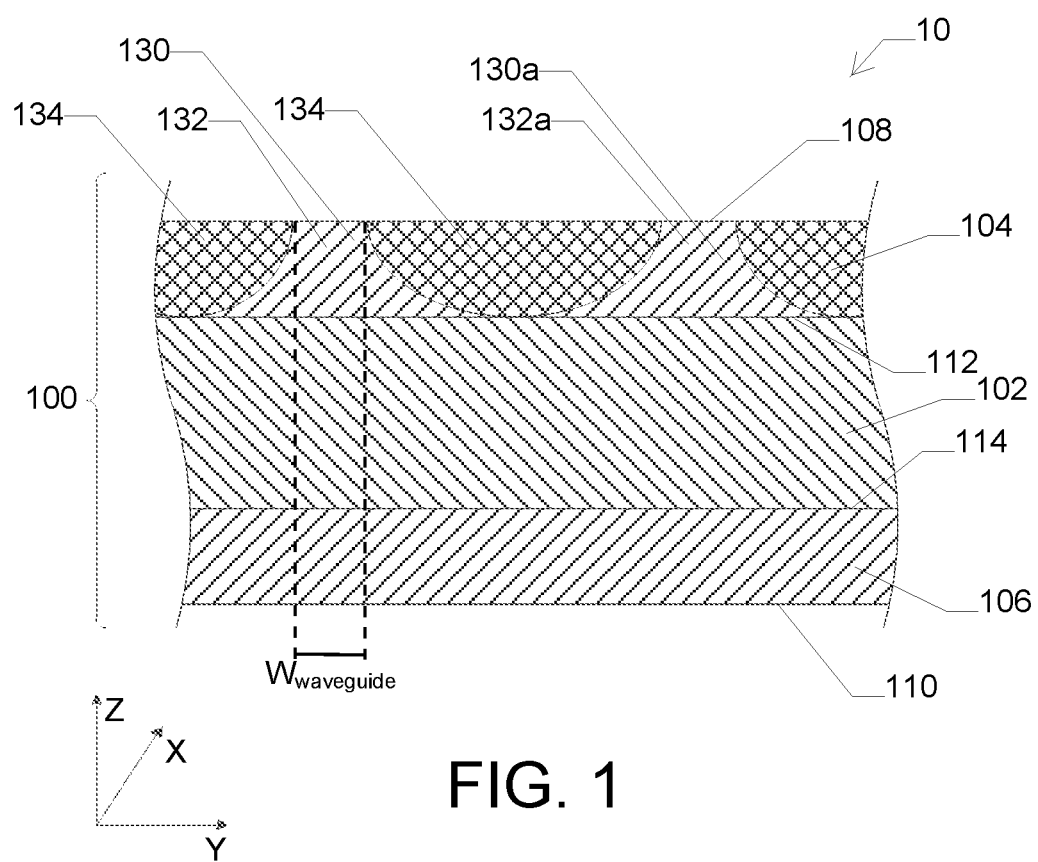
FIG. 1 is a cross-sectional schematic view of one exemplary embodiment of an optical waveguide article comprising a glass laminate structure.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "ion-exchange diffusivity" refers to the interdiffusion or mutual diffusion coefficient for ions involved in an ion exchange process. Mutual diffusion or interdiffusion of ions can be described by Fick's $2^{nd}$ law which, in one dimension, is defined by the following equation:

$$\frac{\partial c}{\partial t} = \frac{\partial J}{\partial x} = \frac{\partial}{\partial x}\left(D\frac{\partial c}{\partial x}\right)$$

where x is the coordinate in glass thickness direction, c is the concentration of ions, such as, for example, $Na^+$, J is the concentration flux, and D is the effective mutual diffusivity as defined in J. Crank, THE MATHEMATICS OF DIFFUSION, 2nd ed., Oxford Science Publications (2001).

As used herein, the term "photosensitive glass" refers to a glass that can undergo a transformation in response to exposure to radiation, such as at least a portion of the glass being transformed into glass-ceramic. Examples of photosensitive glass include, but are not limited to, photoreactive glass and photorefractive glass. The transformation can be manifest, for example, by opalization, by a change in refractive index, or by a change in absorption spectrum of electromagnetic radiation (e.g., a change in color). In some embodiments, the radiation comprises ultraviolet (UV) radiation. In some embodiments, the exposure to radiation is followed by a development treatment (e.g., a heat treatment) to aid in bringing about the transformation of the glass. In some embodiments, exposure of the photosensitive glass to the radiation followed by the development treatment causes opalization of the exposed portion of the photosensitive glass. The term "photosensitive glass" can be used to refer to the material in either the untransformed state (i.e., prior to exposure to radiation and/or development treatment) or the transformed state (i.e., after exposure to radiation and/or development treatment).

As used herein, the term "average coefficient of thermal expansion," or "average CTE," refers to the average coefficient of linear thermal expansion of a given material or layer between 0° C. and 300° C. As used herein, the term "coefficient of thermal expansion," or "CTE," refers to the average coefficient of thermal expansion unless otherwise indicated. The CTE can be determined, for example, using the procedure described in ASTM E228 "Standard Test Method for Linear Thermal Expansion of Solid Materials With a Push-Rod Dilatometer" or ISO 7991:1987 "Glass— Determination of coefficient of mean linear thermal expansion."

In various embodiments described herein, a glass laminate structure comprises a compressive stress or a tensile stress at a given depth within the glass laminate structure. Compressive stress and/or tensile stress values can be determined using, any suitable technique including, for example, a birefringence based measurement technique, a refracted near-field (RNF) technique, or a photoelastic measurement technique (e.g., using a polarimeter). Exemplary standards for stress measurement include, for example, ASTM C1422/C1422M-10 "Standard Specification for Chemically Strengthened Flat Glass" and ASTM F218 "Standard Method for Analyzing Stress in Glass."

In various embodiments, an optical waveguide article comprises a glass laminate structure comprising a base layer and at least one surface layer adjacent to the base layer. Each of the base layer and the surface layer is a glass layer comprising, independently, a glass material, a ceramic material, a glass-ceramic material, or a combination thereof. The base layer has a base refractive index $n_{base}$, and the surface layer has a surface refractive index $n_{surface}$. Base refractive index $n_{base}$ and surface refractive index $n_{surface}$ refer to the refractive index of the respective layers prior to any ion-exchange treatment as described herein. For example, the base layer is formed from a first glass composition with base refractive index $n_{base}$, and the surface layer is formed from a second glass composition with surface refractive index $n_{surface}$ that is different than $n_{base}$. For example, $n_{base}$ and $n_{surface}$ differ by at least about 0.001. In some embodiments, $n_{base}$ is less than $n_{surface}$. In other embodiments, $n_{base}$ is greater than $n_{surface}$. The optical waveguide article comprises at least one waveguide disposed within the surface layer of the glass laminate structure. The waveguide comprises a region of relatively high refractive index at least partially surrounded by one or more regions of relatively low refractive index. For example, the waveguide comprises a relatively high refractive index channel extending within a relatively low refractive index matrix of the surface layer. In some embodiments, the refractive index of a portion of the surface layer is reduced to form the waveguide (e.g., to form the relatively low refractive index matrix). In other embodiments, the refractive index of a portion of the surface layer is increased to form the waveguide (e.g., to form the relatively high refractive index channel). The refractive index of the surface layer can be modified by subjecting the laminated structure to an ion-exchange treatment to form the waveguide as described herein.

FIG. 1 is a cross-sectional schematic view of one exemplary embodiment of an optical waveguide article 10 comprising a glass laminate structure 100. In some embodiments, glass laminate structure 100 comprises a laminated glass sheet comprising a plurality of glass layers. The laminated glass sheet can be substantially planar as shown in FIG. 1 or non-planar (e.g., curved or bent). Glass laminate structure 100 comprises a base layer 102 and a surface layer 104 adjacent to the base layer. In some embodiments, glass laminate structure 100 comprises a second surface layer 106 adjacent to base layer 102, and the base layer is disposed between surface layer 104 and the second surface layer as shown in FIG. 1. In other embodiments, the second surface layer is omitted. In some embodiments, surface layer 104 and/or second surface layer 106 are exterior layers as shown in FIG. 1. For example, an outer surface 108 of surface layer 104 serves as an outer surface of glass laminate structure 100 and/or an outer surface 110 of second surface layer 106 serves as an outer surface of the glass laminate structure. In other embodiments, the surface layer and/or the second surface layer are intermediate layers disposed between the base layer and an exterior layer. In such embodiments, the exterior layer can be an exterior glass layer, a coating layer (e.g., a polymeric, metallic, or ceramic coating layer), or another suitable layer. In some embodiments, the exterior layer comprises a transparent conductor, a semiconductor, an electro-optic, or a liquid crystal.

Base layer 102 comprises a first major surface 112 and a second major surface 114 opposite the first major surface. In some embodiments, surface layer 104 is fused to first major surface 112 of base layer 102. Additionally, or alternatively, second surface layer 106 is fused to second major surface 114 of base layer 102. In such embodiments, an interface between surface layer 104 and base layer 102 and/or an interface between second surface layer 106 and the base layer are free of any bonding material such as, for example, an adhesive, a coating layer, or any non-glass material added or configured to adhere the respective surface layer to the base layer. Thus, surface layer 104 and/or second surface layer 106 are fused directly to base layer 102 or are directly adjacent to the base layer. In some embodiments, the glass laminate structure comprises one or more intermediate layers disposed between the base layer and the surface layer and/or between the base layer and the second surface layer. For example, the intermediate layers comprise intermediate glass layers and/or diffusion layers formed at the interface of the base layer and the surface layer. The diffusion layer can comprise a blended region comprising components of each layer adjacent to the diffusion layer (e.g., a blended region between two directly adjacent glass layers). In some embodiments, glass laminate structure 100 comprises a glass-glass laminate (e.g., an in situ fused multilayer glass-glass laminate) in which the interfaces between directly adjacent glass layers are glass-glass interfaces.

In some embodiments, base layer 102 is formed from or comprises a first glass composition, and surface layer 104 and/or second surface layer 106 are formed from or comprise a second glass composition that is different than the first glass composition. The first glass composition and the second glass composition are different from each other prior to subjecting the glass laminate structure to any type of ion-exchange treatment as described herein. For example, in the embodiment shown in FIG. 1, base layer 102 comprises the first glass composition, and each of surface layer 104 and second surface layer 106 comprises the second glass composition. In other embodiments, the surface layer comprises the second glass composition, and the second surface layer comprises a third glass composition that is different than the first glass composition and/or the second glass composition.

Optical waveguide article 10 comprises a waveguide 130 disposed within surface layer 104 of glass laminate structure 100. Waveguide 130 comprises a high refractive index region 132 that is at least partially surrounded or enveloped by a low refractive index region 134. The terms "high refractive index" and "low refractive index" are relative terms, meaning that a refractive index $n_{high}$ of high refractive index region 132 is greater than a refractive index $n_{low}$ of low refractive index region 134. For example, $n_{high}$ and $n_{low}$ differ by at least about 0.001 and/or satisfy the equation $n_{high} - n_{low} \geq 0.001$. In some embodiments, waveguide 130 comprises a transition region between high refractive index region 132 and low refractive index region 134. The refractive index of the transition region varies between $n_{high}$ and $n_{low}$. The transition region can be a result of, for example, the composition gradient created by the ion-exchange treatment used to form waveguide 130 as described herein. In some embodiments, $n_{high}$ is substantially equal or equal to $n_{surface}$. Thus, the refractive index of a portion of surface layer 104 can be reduced to form low refractive index region 134 without substantially reducing the refractive index of high refractive index region 132 as described herein. In other embodiments, $n_{low}$ is substantially equal or equal to $n_{surface}$. Thus, the refractive index of a portion of surface layer 104 can be increased to form high refractive index region 132 without substantially increasing the refractive index of low refractive index region 134 as described herein.

In the embodiment shown in FIG. 1, high refractive index region 132 comprises a high refractive index channel, and low refractive index region 134 comprises a low refractive index matrix at least partially surrounding the channel. The high refractive index channel extends within the low refractive index matrix (e.g., in a length direction or an X direction). The high refractive index channel is bounded on opposing lateral sides by the low refractive index matrix. Additionally, or alternatively, the high refractive index channel is bounded on a base side facing toward base layer 102 by the base layer or by the low refractive index matrix. Additionally, or alternatively, the high refractive index channel is bounded on a surface side opposite the base side and facing away from base layer 102 by the low refractive index matrix or a low refractive index medium. The low refractive index medium comprises, for example, air, a coating layer (e.g., a glass, metallic, or ceramic coating layer), or another suitable medium with a low refractive index compared to $n_{high}$. Surrounding high refractive index region 132 with materials having lower refractive indices enables waveguide 130 to function as an optical waveguide. For example, light injected into high refractive index region 132 propagates through the high refractive index region in a propagation direction (e.g., in the length direction or the X direction).

In some embodiments, the one or more waveguides comprises a plurality of waveguides disposed within surface layer 104. For example, in the embodiment shown in FIG. 1, the one or more waveguides comprises waveguide 130 and a second waveguide 130a adjacent to waveguide 130. Second waveguide 130a comprises a second high refractive index region 132a at least partially surrounded by low refractive index region 134. For example, second high refractive index region 132a comprises a second high refractive index channel, and low refractive index region 134 comprises a low refractive index matrix disposed between adjacent channels. The high refractive index channels extend within the low refractive index matrix (e.g., in the length direction or the X direction).

Although the embodiment shown in FIG. 1 is described as comprising two waveguides disposed within surface layer 104, other embodiments are included in this disclosure. In other embodiments, the one or more waveguides comprises a determined number of waveguides (e.g., three, four, or more) disposed within the surface layer. The waveguides may have the same configuration (e.g., shape and/or size) or different configurations.

In some embodiments, optical waveguide article 10 comprises a length (e.g., in the X direction), a width (e.g., in a Y direction), and a thickness (e.g., in a Z direction). The length is the largest dimension of optical waveguide article 10, and the thickness is the smallest dimension of the optical waveguide article. The length and/or the width of the optical waveguide article 10 are at least 10, at least 100, or at least 1000 times greater than the thickness of the optical waveguide article. Thus, optical waveguide article 10 can be described as a planar optical waveguide, a slab optical waveguide, or a strip optical waveguide, as distinguished from an optical fiber waveguide. In various embodiments, optical waveguide article 10 may be non-planar. Thus, one or more of the length, the width, or the thickness of optical waveguide article 10 can be nonlinear or curved.

Although high refractive index region 132 is described herein as comprising a plurality of high refractive index channels, and low refractive index region 134 is described as comprising a low refractive index matrix disposed between adjacent channels, other embodiments are included in this disclosure. In other embodiments, the high refractive index region comprises one or more dots, curves, branching channels, another suitable shape, or combinations thereof. In various embodiments, the high refractive index region comprises a shape that enables light to propagate therethrough along a desired path.

The thickness of optical waveguide article 10 and/or glass laminate structure 100 can be measured as the distance between opposing outer surfaces (e.g., outer surfaces 108 and 110) thereof. In some embodiments, optical waveguide article 10 and/or glass laminate structure 100 comprises a thickness of at least about 0.05 mm, at least about 0.1 mm, at least about 0.2 mm, or at least about 0.3 mm. Additionally, or alternatively, optical waveguide article 10 and/or glass laminate structure 100 comprises a thickness of at most about 2 mm, at most about 1.5 mm, at most about 1 mm, at most about 0.7 mm, or at most about 0.5 mm. In some embodiments, a ratio of a thickness of base layer 102 to a thickness of glass laminate structure 100 is at least about 0.1, at least about 0.2, at least about 0.3, at least about 0.4, at least about 0.5, at least about 0.6, at least about 0.7, at least about 0.8, at least about 0.85, at least about 0.9, or at least about 0.95. Additionally, or alternatively, the ratio of the thickness of base layer 102 to the thickness of glass laminate structure 100 is at most about 0.95, at most about 0.93, at most about 0.9, at most about 0.87, at most about 0.85, at most about 0.8, at most about 0.7, at most about 0.6, at most about 0.5, at most about 0.4, at most about 0.3, or at most about 0.2. In some embodiments, a thickness of each of surface layer 104 and/or second surface layer 106 is from about 0.01 mm to about 0.3 mm.

Figure 6:
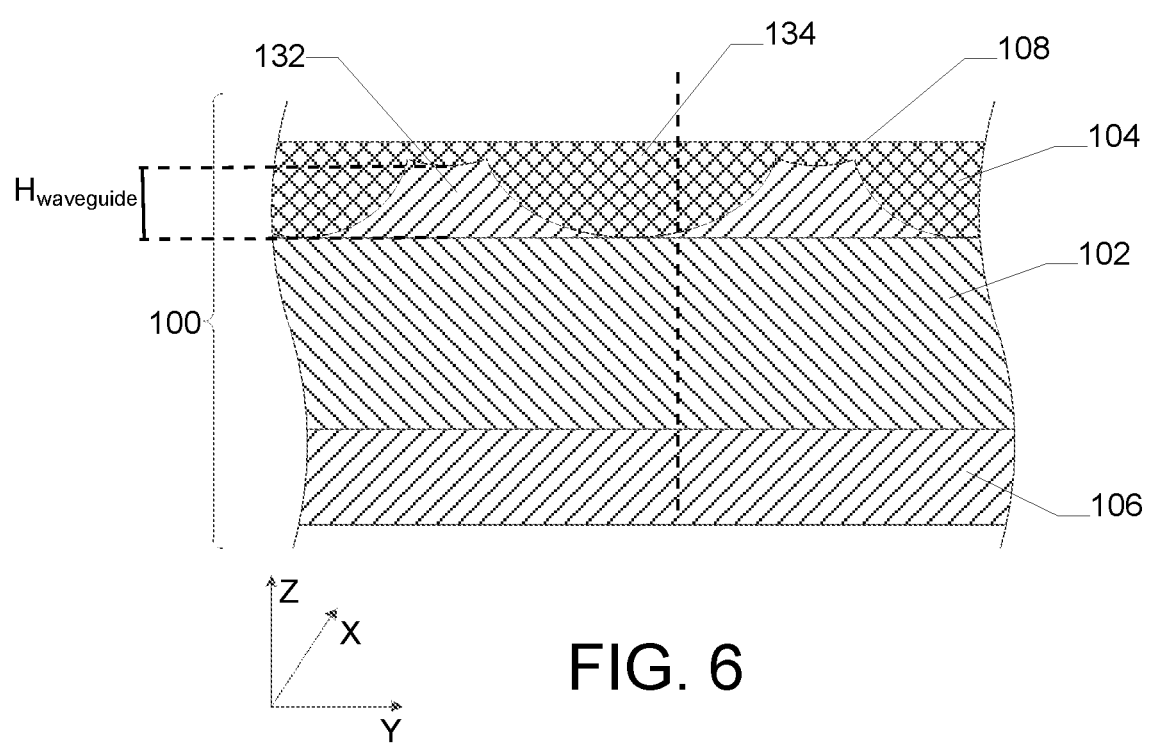
FIG. 6 is a cross-sectional schematic view of the glass laminate structure of FIG. 5 after removing the mask from the outer surface of the surface layer and subjecting the outer surface of the surface layer to a second ion-exchange treatment.

Waveguide 130 (e.g., high refractive index region 132 of the waveguide) comprises a minor dimension. The minor dimension is the smallest dimension of waveguide 130. For example, the minor dimension of waveguide 130 shown in FIG. 1 is a width $W_{waveguide}$ of the waveguide in the Y direction, and the minor dimension of buried waveguide 130 shown in FIG. 6 is a height $H_{waveguide}$ of the waveguide in the Z direction. In some embodiments, the minor dimension of waveguide 130 is about 1 µm to about 10 µm. Such a minor dimension may be beneficial for using the waveguide as a single mode waveguide (e.g., for operating wavelengths of about 0.3 µm to about 1.7 µm). In other embodiments, the minor dimension of waveguide 130 is about 20 µm to about 200 µm. Such a minor dimension may be beneficial for using the waveguide as a multimode waveguide (e.g., for operating wavelengths of about 0.3 µm to about 1.7 µm).

Although the embodiment shown in FIG. 1 is described as comprising waveguide 130 in surface layer 104, other embodiments are included in this disclosure. For example, in other embodiments, an optical waveguide article comprises one or more waveguides disposed in the second surface layer. The waveguide can be formed in the second surface layer as described herein for forming the waveguide in the surface layer. Additionally, or alternatively, additional layers and/or coatings can be applied to an outer surface of the second surface layer as described herein with respect to the surface layer. Additionally, or alternatively, the waveguide disposed in the second layer can have the same or different configuration (e.g., size and pattern) as the waveguide disposed in the surface layer. An optical waveguide article comprising a waveguide disposed in each of the surface layer and the second surface layer can be beneficial for stacking multiple waveguide layers in a relatively small space (e.g., in integrated optics applications).

Figure 2:
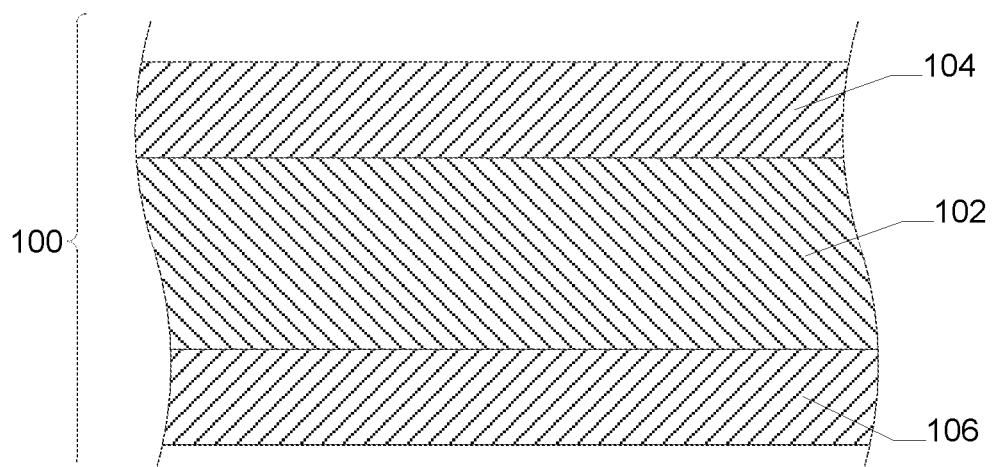
FIG. 2 is a cross-sectional schematic view of the glass laminate structure of FIG. 1 prior to forming a waveguide in a surface layer thereof.

In some embodiments, a method for forming an optical waveguide article includes forming a waveguide in a surface layer of a glass laminate structure. FIG. 2 is a cross-sectional schematic view of glass laminate structure 100 prior to forming waveguide 130 in surface layer 104. The first glass composition of base layer 102 comprises a base refractive index $n_{base}$. The second glass composition of surface layer 104 and/or second surface layer 106 comprises a surface refractive index $n_{surface}$ that is different than $n_{base}$. For example, $n_{base}$ and $n_{surface}$ differ by at least about 0.001 and/or satisfy the equation $|n_{surface}-n_{base}|\geq 0.001$. In the embodiment shown in FIG. 2, $n_{base}$ is less than $n_{surface}$. In other embodiments, $n_{base}$ is greater than $n_{surface}$.

The first glass composition of base layer 102 comprises a base ion-exchange diffusivity $D_{base}$. The second glass composition of surface layer 104 and/or second surface layer 106 comprises a surface ion-exchange diffusivity $D_{surface}$ that is greater than $D_{base}$. Thus, surface layer 104 and/or second surface layer 106 are ion-exchangeable. In some embodiments, $D_{base}$ is substantially zero. Thus, base layer 102 is substantially non-ion-exchangeable or non-ion-exchangeable. In other embodiments, $D_{base}$ is greater than zero. Thus, base layer 102 is ion-exchangeable, but to a lesser degree than surface layer 104 and/or second surface layer 106. In some embodiments, the ion-exchange diffusivities $D_{base}$ and $D_{surface}$ comprise ion-exchange diffusivities with respect to a refractive index increasing ion and a refractive index decreasing ion as described herein. In some embodiments, the first glass composition of base layer 102 is free or substantially free of alkali metals or compounds comprising alkali metals. For example, the first glass composition is free or substantially free of one or more of $Li_2O$, $Na_2O$, $K_2O$, $Rb_2O$, and $Cs_2O$. Additionally, or alternatively, the first glass composition of base layer 102 is free or substantially free of Ag or compounds comprising Ag. Additionally, or alternatively, the first glass composition of base layer 102 is free or substantially free of alkaline earth metals or compounds comprising alkaline earth metals. For example, the first glass composition is free or substantially free of one or more of BeO, MgO, CaO, SrO, and BaO. The difference between $D_{base}$ and $D_{surface}$ can enable formation of the waveguide structure in the surface layer using an ion-exchange process as described herein. The relatively low ion-exchange diffusivity of base layer 102 compared to surface layer 104 can enable the base layer to act as an ion-exchange barrier that limits the depth within glass laminate structure 100 that ions penetrate during an ion-exchange treatment as described herein.

In some embodiments, glass laminate structure 100 comprises a photosensitive component. For example, the first glass composition of base layer 102 and/or the second glass composition of surface layer 104 and/or second surface layer 106 comprises the photosensitive component. In some embodiments, the second glass composition of surface layer 104 comprises the photosensitive component such that, after formation of waveguide 130 in the second layer, high refractive index region 132 comprises the photosensitive component. High refractive index region 132 can be exposed to radiation (e.g., ultraviolet light) to form a pattern therein. For example, the pattern comprises a Bragg grating, a diffraction grating, or another suitable optical pattern. In some embodiments, the photosensitive component comprises Ce, a photosensitive metal, or a combination thereof. The photosensitive metal comprises, for example, Ag, Au, Cu, or combinations thereof. The Ce and/or the photosensitive metal can be in a +1 oxidation state (e.g., $Ce_2O_3$ or $AgNO_3$). The Ce can serve as a sensitizer ion capable of being oxidized and releasing electrons in response to exposure of the glass laminate structure to radiation. The photosensitive metal can be reduced to form colloidal metal particles in response to exposure of the glass laminate structure to radiation and/or subjecting the glass laminate structure to a development treatment. For example, high refractive index region 132 with the photosensitive component comprises a photosensitive glass. Examples of photosensitive glass include, for example, FOTALITE™ or FOTAFORM™, each from Corning Incorporated, Corning, N.Y.

Figure 3:
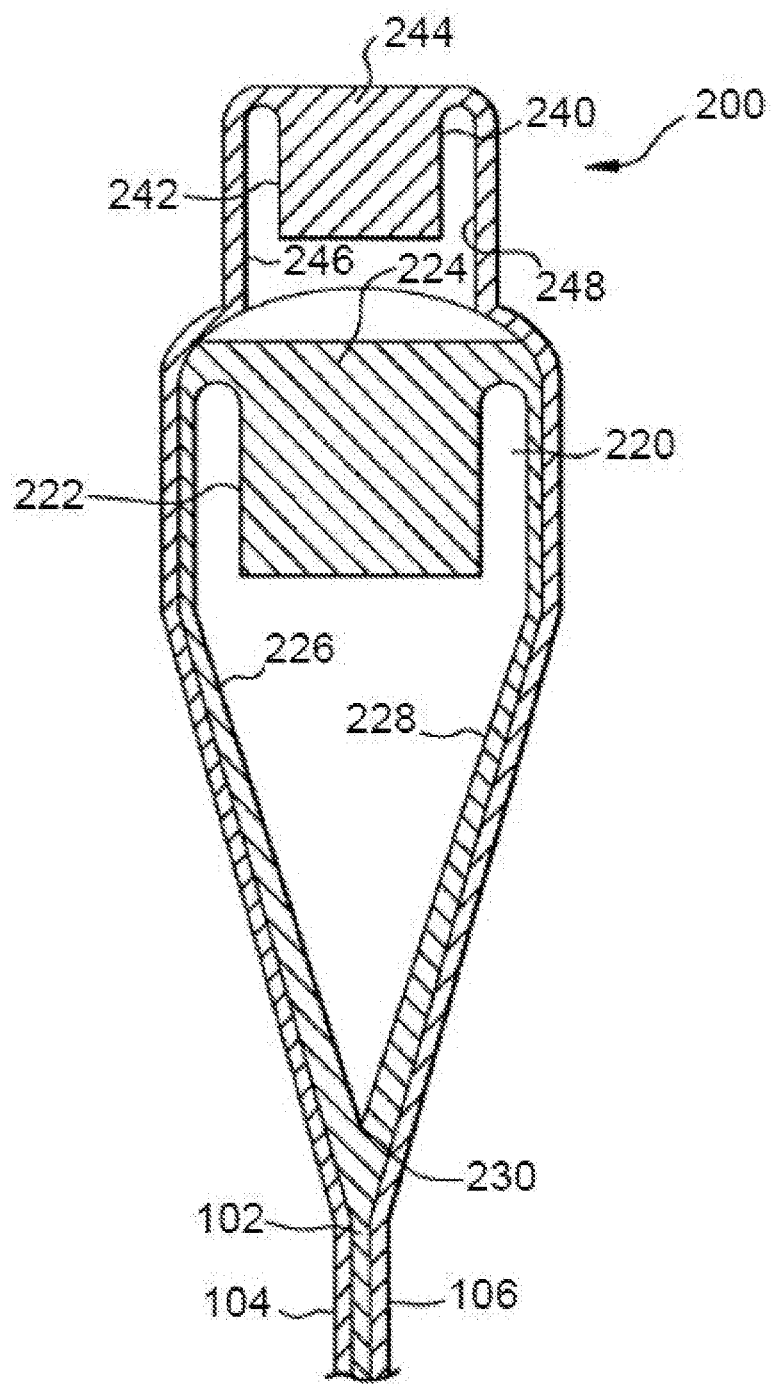
FIG. 3 is a cross-sectional schematic view of one exemplary embodiment of an overflow distributor that can be used to form a glass laminate structure.

The glass laminate structure can be formed using a suitable process such as, for example, a fusion draw, down draw, slot draw, up draw, or float process. In some embodiments, the glass laminate structure is formed using a fusion draw process. FIG. 3 is a cross-sectional schematic view of one exemplary embodiment of an overflow distributor 200 that can be used to form a glass laminate structure such as, for example, glass laminate structure 100. Overflow distributor 200 can be configured as described in U.S. Pat. No. 4,214,886, which is incorporated herein by reference in its entirety. For example, overflow distributor 200 comprises a lower overflow distributor 220 and an upper overflow distributor 240 positioned above the lower overflow distributor. Lower overflow distributor 220 comprises a trough 222. A first glass composition 224 is melted and fed into trough 222 in a viscous state. First glass composition 224 forms base layer 102 of glass laminate structure 100 as further described below. Upper overflow distributor 240 comprises a trough 242. A second glass composition 244 is melted and fed into trough 242 in a viscous state. Second glass composition 244 forms surface layer 104 and second surface layer 106 of glass laminate structure 100 as further described below.

First glass composition 224 overflows trough 222 and flows down opposing outer forming surfaces 226 and 228 of lower overflow distributor 220. Outer forming surfaces 226 and 228 converge at a draw line 230. The separate streams of first glass composition 224 flowing down respective outer forming surfaces 226 and 228 of lower overflow distributor 220 converge at draw line 230 where they are fused together to form base layer 102 of glass laminate structure 100.

Second glass composition 244 overflows trough 242 and flows down opposing outer forming surfaces 246 and 248 of upper overflow distributor 240. Second glass composition 244 is deflected outward by upper overflow distributor 240 such that the second glass composition flows around lower overflow distributor 220 and contacts first glass composition 224 flowing over outer forming surfaces 226 and 228 of the lower overflow distributor. The separate streams of second glass composition 244 are fused to the respective separate streams of first glass composition 224 flowing down respective outer forming surfaces 226 and 228 of lower overflow distributor 220. Upon convergence of the streams of first glass composition 224 at draw line 230, second glass composition 244 forms surface layer 104 and second surface layer 106 of glass laminate structure 100.

In some embodiments, first glass composition 224 of base layer 102 in the viscous state is contacted with second glass composition 244 of surface layer 104 and/or second surface layer 106 in the viscous state to form the laminated sheet. In some of such embodiments, the laminated sheet is part of a glass ribbon traveling away from draw line 230 of lower overflow distributor 220 as shown in FIG. 3. The glass ribbon can be drawn away from lower overflow distributor 220 by a suitable means including, for example, gravity and/or pulling rollers. The glass ribbon cools as it travels away from lower overflow distributor 220. The glass ribbon is severed to separate the laminated sheet therefrom. Thus, the laminated sheet is cut from the glass ribbon. The glass ribbon can be severed using a suitable technique such as, for example, scoring, bending, thermally shocking, and/or laser cutting. In some embodiments, glass laminate structure 100 comprises the laminated sheet as shown in FIGS. 1-2. In other embodiments, the laminated sheet can be processed further (e.g., by cutting or molding) to form glass laminate structure 100.

Although glass laminate structure 100 shown in FIGS. 1-2 comprises three layers, other embodiments are included in this disclosure. In other embodiments, a glass laminate structure can have a determined number of layers, such as two, four, or more layers. For example, a glass laminate structure comprising two layers (e.g., a base layer and a surface layer) can be formed using two overflow distributors positioned so that the two layers are joined while traveling away from the respective draw lines of the overflow distributors, or using a single overflow distributor with a divided trough so that two glass compositions flow over opposing outer forming surfaces of the overflow distributor and converge at the draw line of the overflow distributor. A glass laminate structure comprising four or more layers can be formed using additional overflow distributors and/or using overflow distributors with divided troughs. Thus, a glass laminate structure having a determined number of layers can be formed by modifying the overflow distributor accordingly.

Although glass laminate structure 100 shown in FIGS. 1-2 comprises a laminated sheet, other embodiments are included in this disclosure. In other embodiments, a glass laminate structure comprises a laminated tube comprising multiple tubular layers (e.g., formed by one or more annular orifices or by bending or rolling a laminated glass sheet into a tubular configuration) or a laminated rod comprising a substantially solid core layer surrounded by one or more tubular cladding layers. For example, a partial cross-section of the laminated tube comprises a glass laminate structure similar to that shown in FIGS. 1-2. In other embodiments, a glass laminate structure comprises a shaped glass laminate structure (e.g., formed by shaping or molding a laminated sheet).

In some embodiments, the first glass composition of base layer 102 and/or the second glass composition of surface layer 104 and/or second surface layer 106 comprise a liquidus viscosity of at least about 30 kiloPoise (kP), at least about 50 kP, at least about 100 kP, at least about 200 kP, or at least about 300 kP. In some embodiments, the first glass composition and/or the second glass composition comprise a liquidus viscosity suitable for forming glass laminate structure 100 using a fusion draw process as described herein. For example, the first glass composition of base layer 102 comprises a liquidus viscosity of at least about 100 kP, at least about 200 kP, or at least about 300 kP. Additionally, or alternatively, the first glass composition comprises a liquidus viscosity of at most about 3000 kP, at most about 2500 kP, at most about 1000 kP, or at most about 800 kP. Additionally, or alternatively, the second glass composition of surface layer 104 and/or second surface layer 106 comprises a liquidus viscosity of at least about 50 kP, at least about 100 kP, or at least about 200 kP. Additionally, or alternatively, the second glass composition comprises a liquidus viscosity of at most about 3000 kP, at most about 2500 kP, at most about 1000 kP, or at most about 800 kP. The first glass composition can aid in carrying the second glass composition over the overflow distributor to form the surface layer(s). Thus, the second glass composition can comprise a liquidus viscosity that is lower than generally considered suitable for forming a single layer sheet using a fusion draw process.

In some embodiments, glass laminate structure 100 is mechanically strengthened. For example, the second glass composition of surface layer 104 and/or second surface layer 106 comprises a different CTE than the first glass composition of base layer 102. Such a CTE contrast between directly adjacent layers of glass laminate structure 100 can result in mechanical strengthening of the glass laminate structure. For example, surface layer 104 and second surface layer 106 are formed from a glass composition (e.g., the second glass composition) having a lower CTE than a glass composition (e.g., the first glass composition) of base layer 102. The relatively lower CTE of surface layer 104 and second surface layer 106 compared to base layer 102 results in formation of compressive stress in the surface layers and tensile stress in the base layer upon cooling of glass laminate structure 100. Thus, the difference between the CTE of base layer 102 and the CTE of surface layer 104 and second surface layer 106 produces compressive stress in the surface layers, whereby glass laminate structure 100 is mechanically strengthened. In embodiments in which the surface layers are exterior layers of the glass laminate structure, such compressive stress in the surface layers can be beneficial for the strength of the glass laminate structure by resisting propagation of flaws present at the outer surface of the glass laminate structure. In various embodiments, each of the first and second surface layers, independently, can have a higher CTE, a lower CTE, or substantially the same CTE as the base layer. Including both surface layer 104 and second surface layer 106 can help to protect base layer 102, which may be under tensile stress, and/or to prevent warpage of glass laminate structure 100.

In some embodiments, the CTE of base layer 102 and the CTE of surface layer 104 and/or second surface layer 106 differ by at least about $1 \times 10^{-7 \circ}$ C.$^{-1}$, at least about $2 \times 10^{-7 \circ}$ C.$^{-1}$, at least about $3 \times 10^{-7 \circ}$ C.$^{-1}$, at least about $4 \times 10^{-7 \circ}$ C.$^{-1}$, at least about $5 \times 10^{-7 \circ}$ C.$^{-1}$, at least about $10 \times 10^{-7 \circ}$ C.$^{-1}$, at least about $15 \times 10^{-7 \circ}$ C.$^{-1}$, at least about $20 \times 10^{-7 \circ}$ C.$^{-1}$, at least about $25 \times 10^{-7 \circ}$ C.$^{-1}$, or at least about $30 \times 10^{-7 \circ}$ C.$^{-1}$. Additionally, or alternatively, the CTE of base layer 102 and the CTE of surface layer 104 and/or second surface layer 106 differ by at most about $100 \times 10^{-7 \circ}$ C.$^{-1}$, at most about $75 \times 10^{-7 \circ}$ C.$^{-1}$, at most about $50 \times 10^{-7 \circ}$ C.$^{-1}$, at most about $40 \times 10^{-7 \circ}$ C.$^{-1}$, at most about $30 \times 10^{-7 \circ}$ C.$^{-1}$, at most about $20 \times 10^{-7 \circ}$ C.$^{-1}$, at most about $10 \times 10^{-7 \circ}$ C.$^{-1}$, at most about $9 \times 10^{-7 \circ}$ C.$^{-1}$, at most about $8 \times 10^{-7 \circ}$ C.$^{-1}$, at most about $7 \times 10^{-7 \circ}$ C.$^{-1}$, at most about $6 \times 10^{-7 \circ}$ C.$^{-1}$, or at most about $5 \times 10^{-7 \circ}$ C.$^{-1}$. For example, in some embodiments, the CTE of base layer 102 and the CTE of surface layer 104 and/or second surface layer 106 differ by about $1 \times 10^{-7 \circ}$ C.$^{-1}$ to about $10 \times 10^{-7 \circ}$ C.$^{-1}$ or about $1 \times 10^{-7 \circ}$ C.$^{-1}$ to about $5 \times 10^{7 \circ}$ C.$^{-1}$. In some embodiments, the second glass composition of surface layer and/or second surface layer comprises a CTE of at most about $90 \times 10^{-7 \circ}$ C.$^{-1}$, at most about $89 \times 10^{-7 \circ}$ C.$^{-1}$, at most about $88 \times 10^{-7 \circ}$ C.$^{-1}$, at most about $80 \times 10^{-7 \circ}$ C.$^{-1}$, at most about $70 \times 10^{-7 \circ}$ C.$^{-1}$, at most about $60 \times 10^{-7 \circ}$ C.$^{-1}$, at most about $50 \times 10^{-7 \circ}$ C.$^{-1}$, at most about $40 \times 10^{-7 \circ}$ C.$^{-1}$, or at most about $35 \times 10^{-7 \circ}$ C.$^{-1}$. Additionally, or alternatively, the second glass composition of surface layer 104 and/or second surface layer 106 comprises a CTE of at least about $10 \times 10^{-7 \circ}$ C.$^{-1}$, at least about $15 \times 10^{-7 \circ}$ C.$^{-1}$, at least about $25 \times 10^{-7 \circ}$ C.$^{-1}$, at least about $30 \times 10^{-7 \circ}$ C.$^{-1}$, at least about $40 \times 10^{-7 \circ}$ C.$^{-1}$, at least about $50 \times 10^{-7 \circ}$ C.$^{-1}$, at least about $60 \times 10^{-7 \circ}$ C.$^{-1}$, at least about $70 \times 10^{-7 \circ}$ C.$^{-1}$, at least about $80 \times 10^{-7 \circ}$ C.$^{-1}$, or at least about $85 \times 10^{-7 \circ}$ C.$^{-1}$. Additionally, or alternatively, the first glass composition of base layer 102 comprises a CTE of at least about $40 \times 10^{-7 \circ}$ C.$^{-1}$, at least about $50 \times 10^{-7 \circ}$ C.$^{-1}$, at least about $55 \times 10^{-7 \circ}$ C.$^{-1}$, at least about $65 \times 10^{-7 \circ}$ C.$^{-1}$, at least about $70 \times 10^{-7 \circ}$ C.$^{-1}$, at least about $80 \times 10^{-7 \circ}$ C.$^{-1}$, or at least about $90 \times 10^{-7 \circ}$ C.$^{-1}$. Additionally, or alternatively, the first glass composition of base layer 102 comprises a CTE of at most about $120 \times 10^{-7 \circ}$ C.$^{-1}$, at most about $110 \times 10^{-7 \circ}$ C.$^{-1}$, at most about $100 \times 10^{-7 \circ}$ C.$^{-1}$, at most about $90 \times 10^{-7 \circ}$ C.$^{-1}$, at most about $75 \times 10^{-7 \circ}$ C.$^{-1}$, or at most about $70 \times 10^{-7 \circ}$ C.$^{-1}$.

Figure 4:
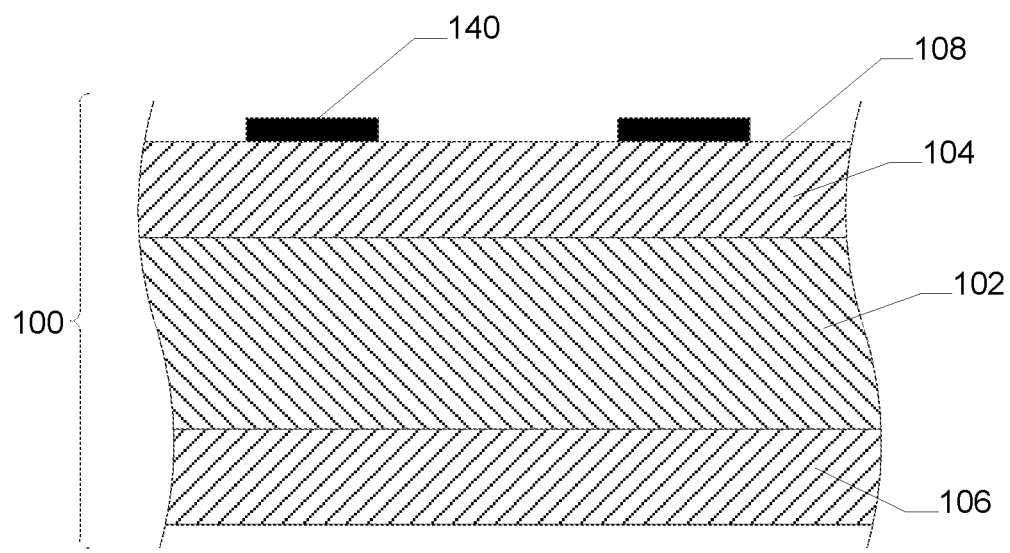
FIG. 4 is a cross-sectional schematic view of the glass laminate structure of FIG. 2 with a mask applied to an outer surface of the surface layer.

In some embodiments, forming the waveguide in the surface layer of a glass laminate structure comprises applying a mask to a surface of the glass laminate structure. FIG. 4 is a cross-sectional schematic view of glass laminate structure 100 with mask 140 applied to outer surface 108 of surface layer 104. Mask 140 covers a portion of outer surface 108 of surface layer 104. The covered portion of outer surface 108 of surface layer 104 corresponds to an intended waveguide pattern of waveguide 130. For example, mask 140 comprises a shape that corresponds to an intended pattern of high refractive index region 132 of waveguide 130. In the embodiment shown in FIG. 4, mask 140 comprises a plurality of lines corresponding to the plurality of high refractive index channels of waveguide 130 and second waveguide 130a (FIG. 1). In other embodiments, the mask comprises one or more dots, curves, branching channels, other suitable shapes, or combinations thereof. A remaining portion of outer surface 108 of surface layer 104 that is uncovered by mask 140 corresponds to an intended pattern of low refractive index region 134.

Mask 140 serves as an ion-exchange barrier while subjecting the glass laminate structure to an ion-exchange treatment to form the waveguide in the surface layer as described herein. Thus, mask 140 comprises a material that inhibits ion-exchange at the covered portion of outer surface 108 of surface layer 104. For example, mask comprises a metallic material (e.g., titanium or aluminum), a polymeric material, or another suitable ion-exchange barrier material. Mask 140 can be applied to outer surface 108 of surface layer 104 using, for example, sputtering (e.g., ion-assisted sputtering), evaporation (e.g., e-beam evaporation or thermal evaporation), vapor deposition (e.g., chemical or physical vapor deposition, including plasma chemical vapor deposition), printing (e.g., gravure or screen printing), lithography, or another suitable deposition process.

Figure 5:
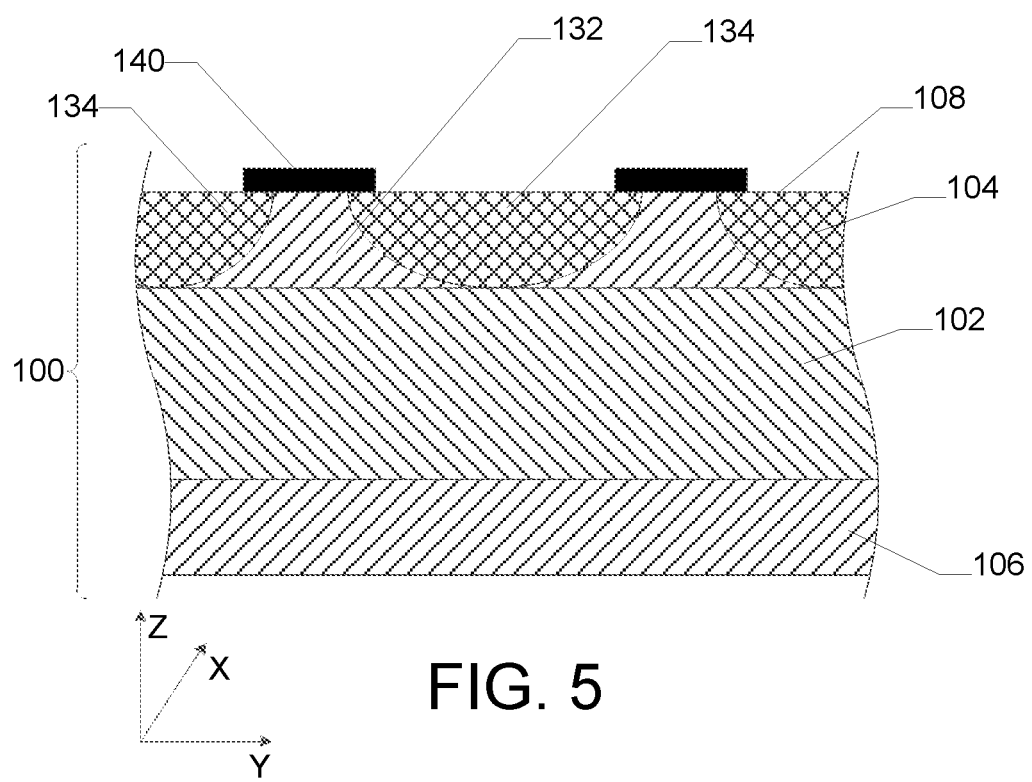
FIG. 5 is a cross-sectional schematic view of the glass laminate structure of FIG. 4 after selectively subjecting an uncovered portion of the outer surface of the surface layer to an ion-exchange treatment to form a low refractive index region of the surface layer.

In some embodiments, forming the waveguide in the surface layer of the glass laminate structure comprises subjecting the glass laminate structure to a selective ion-exchange treatment to form the low refractive index region within the surface layer. For example, surface layer 104 of glass laminate structure 110 with mask 140 applied thereto is subjected to an ion-exchange treatment to selectively reduce the refractive index in a portion of the surface layer and form low refractive index region 134 without substantially reducing the refractive index of a remaining portion of the surface layer corresponding to high refractive index region 132. Selectively subjecting an uncovered portion of outer surface 108 of surface layer 104 to the ion-exchange treatment enables formation of high refractive index region 134 comprising a desired pattern. FIG. 5 is a cross-sectional schematic view of glass laminate structure 100 after applying mask 140 to outer surface 108 of surface layer 104 and selectively subjecting the uncovered or exposed portion of the outer surface of the surface layer to the ion-exchange treatment. In some embodiments, the second glass composition of surface layer 104 and/or second surface layer 106 comprises a sufficiently high concentration of refractive index increasing ions (e.g., $K^+$ or $Ag^+$ ions) that an ion-exchange treatment with an ion-exchange medium comprising refractive index decreasing ions (e.g., $Na^+$) reduces the refractive index of the surface layer and/or the second surface layer within the ion-exchanged region.

In some embodiments, the ion-exchange treatment comprises applying an ion-exchange medium to outer surface 108 of glass laminate structure 100. The ion-exchange medium comprises a solution, a paste, a gel, a liquid, a vapor, a plasma, or another suitable medium comprising refractive index decreasing ions to be exchanged with refractive index increasing ions in the glass matrix (e.g., the glass matrix of surface layer 104). In some embodiments, the second glass composition of surface layer 104 and/or second surface layer 106 comprises an alkali aluminosilicate glass. Thus, the refractive index increasing ions in surface layer 104 and the refractive index decreasing ions in the ion exchange medium may be monovalent alkali metal cations (e.g., $Li^+$, $Na^+$, $K^+$, $Rb^+$, and/or $Cs^+$). Alternatively, monovalent cations in surface layer 104 may be replaced with monovalent cations other than alkali metal cations (e.g., $Ag^+$ or the like). In some embodiments, the second glass composition of surface layer 104 and/or second surface layer 106 comprises an alkaline earth aluminosilicate glass. Thus, the refractive index increasing ions in surface layer 104 and the refractive index decreasing ions in the ion exchange medium may be divalent alkaline earth cations (e.g., $Be^{2+}$, $Mg^{2+}$, $Ca^{2+}$, $Sr^{2+}$, and/or $Ba^{2+}$). In some embodiments, the ion-exchange medium comprises a molten salt solution, and the ion-exchange treatment comprises immersing the glass laminate structure in a molten salt bath comprising refractive index decreasing ions (e.g., $Na^+$) to be exchanged with refractive index increasing ions (e.g., $K^+$) in the glass matrix of surface layer 104. In some embodiments, the molten salt bath comprises a salt (e.g., a nitrate, a sulfate, and/or a chloride) of the refractive index decreasing ions. For example, the molten salt bath comprises molten $NaNO_3$. Additionally, or alternatively, the temperature of the molten salt bath is from about 380° C. to about 450° C., and an immersion time is from about 2 hours to about 16 hours.

In some embodiments, the ion-exchange treatment may affect the strength of optical waveguide article 10. For example, exchanging $K^+$ ions in the glass matrix with $Na^+$ ions in the ion-exchange medium can decrease the compressive stress in at least a portion of surface layer 104. In some embodiments, glass laminate structure 100 is mechanically strengthened as described herein (e.g., by CTE mismatch). Such mechanical strengthening can be sufficient to maintain surface layer 104 in compression even after the ion-exchange treatment.

By replacing refractive index increasing ions in the glass matrix of surface layer 104 with refractive index decreasing ions at the uncovered portion of outer surface 108, the refractive index of a portion of the surface layer is reduced to form low refractive index region 134. For example, during the ion-exchange treatment, the refractive index decreasing ions from the ion-exchange medium diffuse into the uncovered portion of outer surface 108 of surface layer 104 and the refractive index increasing ions from the glass matrix diffuse out of the uncovered portion of the outer surface of the surface layer. Thus, the uncovered portion of surface layer 104 (and the corresponding portion beneath the uncovered portion in which ion-exchange takes place) comprises an ion-exchanged region of the surface layer, and a remainder of the surface layer comprises a non-ion-exchanged region of the surface layer. The increased concentration of the refractive index decreasing ions in the ion-exchanged region decreases the refractive index of surface layer 104 in the ion-exchanged region without substantially decreasing the refractive index of the surface layer in the non-ion-exchanged region.

As shown in FIG. 5, low refractive index region 134 has a curved or nonlinear shape resulting from ion-exchange from outer surface 108 of surface layer 104. Such a nonlinear shape is a result of ion-exchange being a diffusion process that takes place in multiple dimensions, resulting in ion-exchange taking place to some extent beneath the edges of mask 140. For example, increasing the time and/or temperature of the ion-exchange treatment can increase the distance beneath mask 140 to which low refractive index region 134 extends. In some embodiments, the minor dimension of high refractive index region 132 (e.g., the width in the Y direction) is at most about 10 μm, at most about 5 μm, or at most about 2 μm. Such a small minor dimension can be useful, for example, for single mode optical waveguide applications. By starting with a high refractive index glass in surface layer 104 and using ion-exchange to decrease the refractive index in selected regions of the surface layer, it is unnecessary for mask 140 to have a minor dimension (e.g., a width in the Y direction) as small as the minor dimension of high refractive index region 134. Instead, mask 140 can have a larger minor dimension, and the ion-exchange treatment can be conducted in such a manner to control the extent to which low refractive index region 134 extends beneath the mask to achieve high refractive index region 132 having a desired minor dimension. The ability to use a wider mask to achieve a narrower high refractive index region can reduce the complexity of depositing the mask on the outer surface of the surface layer, while achieving a waveguide with desired dimensions.

Base layer 102 is substantially non-ion-exchangeable or non-ion-exchangeable as described herein. Thus, base layer 102 serves as an ion-exchange barrier that prevents ion-exchange deep into glass laminate structure 100 beyond surface layer 104. Such an ion-exchange barrier can enable a thickness of high refractive index region 132 (e.g., in the Z direction) to be controlled independent of the width of the high refractive index region (e.g., in the Y direction). Thus, the ion-exchange treatment can be adjusted to achieve the desired width of the high refractive index region as described herein without increasing the height of the high refractive index region. Independent control of the cross-sectional dimensions of the high refractive index region can enable an optical waveguide with beneficial performance characteristics. Additionally, or alternatively, the low ion-exchange diffusivity of base layer 102 can prevent refractive index increasing ions present in high refractive index region 132 from diffusing deeper into glass laminate structure 100 beyond the interface between surface layer 104 and the base layer. Such an ion-exchange barrier can help to maintain the shape of the high refractive index region during the ion-exchange treatment, additional ion-exchange treatments (e.g., the second ion-exchange treatment described herein), and/or other processing treatments.

In embodiments including a second surface layer, the second surface layer can comprise or be formed from the same or a different glass composition as the surface layer. For example, second surface layer 106 can be formed from the second glass composition of surface layer 104 or a third glass composition as described herein. Thus, the second surface layer can have a refractive index that is higher or lower than the base layer prior to any ion-exchange treatment. In embodiments in which the refractive index of the glass composition of the second surface layer is less than $n_{base}$, no additional processing (e.g., ion-exchange) of the second surface layer may be performed, as light propagating through the base layer will not tend to leak from the relatively high refractive index base layer into the relatively low refractive index second surface layer. Alternatively, in embodiments in which the refractive index of the glass composition of the second surface layer is greater than $n_{base}$, additional processing of the second surface layer may be beneficial to prevent light propagating through the base layer from leaking into the second surface layer and, potentially, out of the glass laminate structure. In some embodiments, the second surface layer is subjected to an ion-exchange treatment to decrease the refractive index of at least a portion of the second surface layer. For example, the second surface layer is subjected to an ion-exchange treatment as described herein with reference to the surface layer 106, except without the mask. Thus, the entire or substantially the entire outer surface of the second surface layer is exposed during the ion-exchange treatment so that the refractive index of at least a portion of the second surface layer is decreased to be less than $n_{base}$. For example, all or substantially all of the second surface layer comprises a low refractive index region. Additionally, or alternatively, the second surface layer comprises an ion-exchanged region comprising a refractive index gradient. For example, the refractive index of the ion-exchanged region is highest near the outer surface and decreases in an inward direction toward the base layer (e.g., as a result of the diffusion of refractive index decreasing ions into the second surface layer from the outer surface).

In some embodiments, forming the waveguide in the surface layer of the glass laminate structure comprises burying the waveguide or burying the high refractive index region.

In some embodiments, burying the waveguide or burying the high refractive index region comprises extending the low refractive index region to occupy a surface region of the surface layer. For example, surface layer 104 of glass laminate structure 110 with low refractive index region 134 formed therein and mask 140 removed therefrom is subjected to a second ion-exchange treatment to extend the low refractive index region to occupy a surface region of the surface layer disposed between high refractive index region 132 and outer surface 108 of the surface layer. FIG. 6 is a cross-sectional schematic view of glass laminate structure 100 after forming low refractive index region 134 therein, removing mask 140 from outer surface 108 of surface layer 104, and subjecting the outer surface of the surface layer to a second ion-exchange treatment. The second ion-exchange treatment can be performed as described above with respect to the ion-exchange treatment. However, the conditions (e.g., the time and/or temperature) of the second ion-exchange treatment are adjusted such that the depth (e.g., in the Z direction) to which the refractive index decreasing ions diffuse during the second ion-exchange treatment is shallower than the depth to which the refractive index decreasing ions diffuse during the ion-exchange treatment. Thus, low refractive index region 134 is extended such that high refractive index region 132 is separated from outer surface 108 of second layer 104 by the low refractive index region as shown in FIG. 6.

Figure 7:
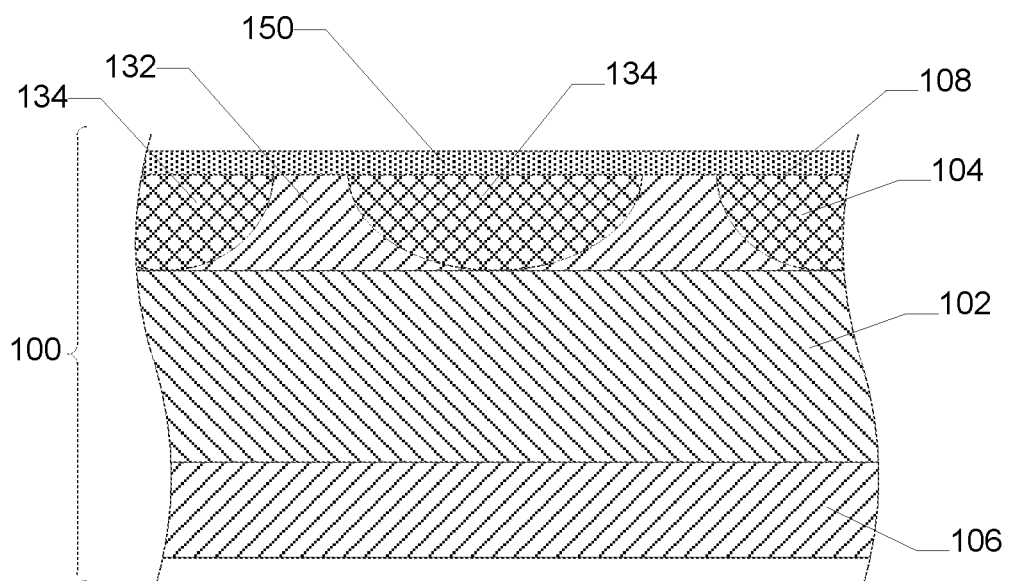
FIG. 7 is a cross-sectional schematic view of the glass laminate structure of FIG. 5 after removing the mask from the outer surface of the surface layer and applying a low refractive index coating layer to the outer surface of the surface layer.

In some embodiments, burying the waveguide or burying the high refractive index region comprises coating the outer surface of the surface layer with a low refractive index material. FIG. 7 is a cross-sectional schematic view of glass laminate structure 100 after forming low refractive index region 134 therein, removing mask 140 from outer surface 108 of surface layer 104, and applying a low refractive index coating layer 150 to the outer surface of the surface layer. Low refractive index coating layer comprises a low refractive index material with a refractive index that is less than $n_{high}$ (e.g., at least 0.001 less than $n_{high}$). The low refractive index material comprises, for example, a glass material, a polymeric material, a metallic material, another suitable low refractive index material, or combinations thereof. In some embodiments, the low refractive index coating layer comprises a transparent conductor, a semiconductor, an electro-optic, or a liquid crystal. Low refractive index coating layer 150 can be applied to outer surface 108 of surface layer 104 using, for example, sputtering (e.g., ion-assisted sputtering), evaporation (e.g., e-beam evaporation or thermal evaporation), vapor deposition (e.g., chemical or physical vapor deposition, including plasma chemical vapor deposition), printing (e.g., gravure or screen printing), lithography, or another suitable deposition process. In some embodiments, such as embodiments in which low refractive index coating layer 150 comprises a polymeric material, the low refractive index layer comprises one or more dopants. Such dopants can provide functionality. For example, such dopants comprise fluorescent dye dopants, organic nonlinear optical polymers, or electro-optical materials such as liquid crystals. In some embodiments, such as embodiments in which low refractive index coating layer 150 comprises a glass material, the low refractive index coating layer comprises one or more rare-earth dopants. The low refractive index coating layer can be applied to the entire or substantially the entire outer surface of the glass laminate structure as shown in FIG. 7 or applied selectively to only a portion of the outer surface of the glass laminate structure. For example, the low refractive index coating layer can be applied selectively to the high refractive index region of the outer surface (e.g., the waveguide), leaving the low refractive index region of the outer surface uncovered by the coating layer.

Figure 8:
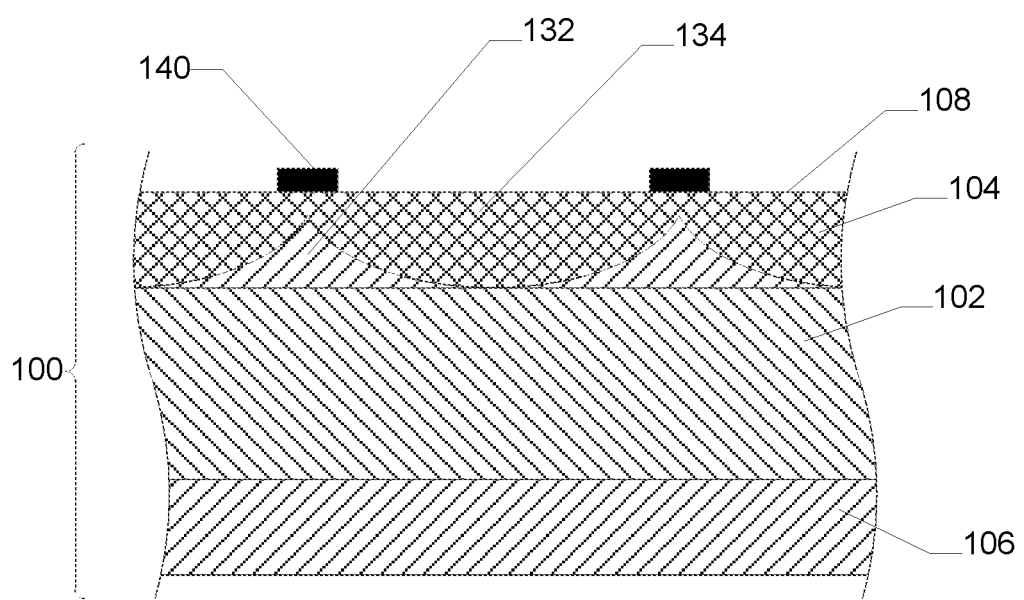
FIG. 8 is a cross-sectional schematic view of the glass laminate structure of FIG. 2 with a mask applied to an outer surface of the surface layer and after selectively subjecting an uncovered portion of the outer surface of the surface layer to an ion-exchange treatment to form a low refractive index region of the surface layer.

In some embodiments, burying the waveguide or burying the high refractive index region is performed as part of forming the waveguide in the surface layer of the glass laminate structure. For example, the size of the mask and the ion-exchange conditions can be selected such that, during subjecting the glass laminate structure to the selective ion-exchange treatment to form the low refractive index region within the surface layer, the high refractive index region is buried within the surface layer. FIG. 8 is a cross-sectional schematic view of glass laminate structure 100 after forming low refractive index region 134 therein. Mask 140 shown in FIG. 8 is smaller (e.g., narrower) than the mask shown in FIGS. 4-5. The ion-exchange treatment is performed at a temperature and for a time such that low refractive index regions 134 formed on opposing sides of mask 140 during the ion-exchange treatment are joined under mask 140 to form a unitary low refractive index region. The unitary low refractive index region is disposed between high refractive index region 132 and outer surface 108 of surface layer 104 such that the waveguide is buried within the surface layer.

Burying the waveguide or burying the high refractive index region can help to ensure that the high refractive index region is completely surrounded by materials having lower indices of refraction, which can improve the performance of the optical waveguide article.

In various embodiments, one or more layers of glass laminate structure 100 (e.g., base layer 102, surface layer 104, and/or second surface layer 106) comprise one or more dopants. Such dopants can provide functionality. For example, such dopants comprise rare-earth elements (e.g., Nd or Er), which can be beneficial for waveguide laser applications.

In various embodiments, an outer surface of the glass laminate structure comprises a textured surface. For example, the outer surface of the surface layer is doped with a fast etching material (e.g., a glass composition with a higher etch rate in a selected solvent than the second glass composition of the surface layer). The outer surface can be etched to form surface features (e.g., cavities or trenches) near or on the waveguide. In some embodiments, the surface features are filled with one or more functional materials. The functional material comprises, for example scattering particles, a dye (e.g., a fluorescent dye or a laser dye), an epoxy (e.g., a UV epoxy), an electro-optic liquid (e.g., a liquid crystal material), or combinations thereof). In use, light propagating through the waveguide can interact with the functional material, for example, to perform a device function (e.g., to activate the functional material disposed in the surface features).

Figure 9:
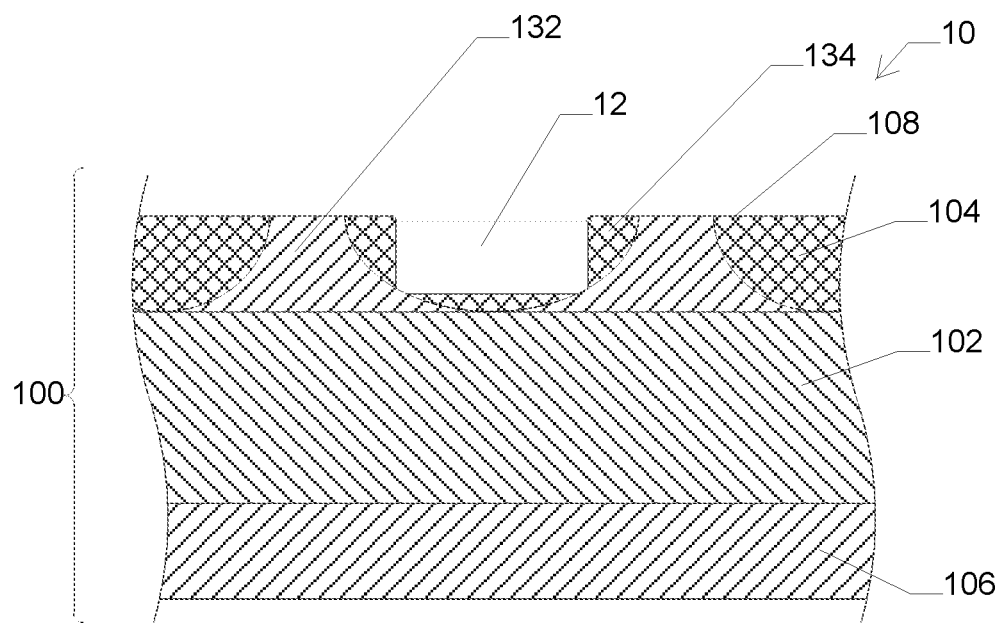
FIG. 9 is a cross-sectional schematic view of the glass laminate structure of FIG. 5 after removing the mask from the outer surface of the surface layer and forming a cavity in the low refractive index region of the surface layer.

FIG. 9 is a cross-sectional schematic view of one embodiment of optical waveguide article 10 comprising a cavity 12 formed therein. For example, cavity 12 comprises a void or recess extending inward from outer surface 108 of surface layer 104 toward base layer 102. Additionally, or alternatively, cavity 12 is disposed within low refractive index region 134. In some embodiments, cavity 12 is formed by etching outer surface 108 of surface layer 104. For example, low refractive index region 134 is more soluble in a selected etchant than high refractive index region 132 such that applying the selected etchant to outer surface 108 removes a portion of the high refractive index region to form cavity 12. In other embodiments, cavity 12 can be formed by laser ablation or another suitable material removal process. In some embodiments, optical waveguide article 10 comprises one or more functional materials disposed within cavity 12.

In various embodiments, the optical waveguide article comprises one or more coating layers (e.g., glass or polymeric coating layers) as described herein. In some embodiments, a coating layer comprises a photosensitive component. The coating layer can be exposed to radiation (e.g., ultraviolet light) to form a pattern therein. For example, the pattern comprises a Bragg grating, a diffraction grating, or another suitable optical pattern. Additionally, or alternatively, a coating layer comprises a hybrid mixture of a glass material and a polymeric material. For example, a coating layer comprises a hybrid mixture of a UV curable polymer and glass nano particles with index matching the polymer. The nano particles can comprise a base glass with or without a dopant material.

Figure 10:
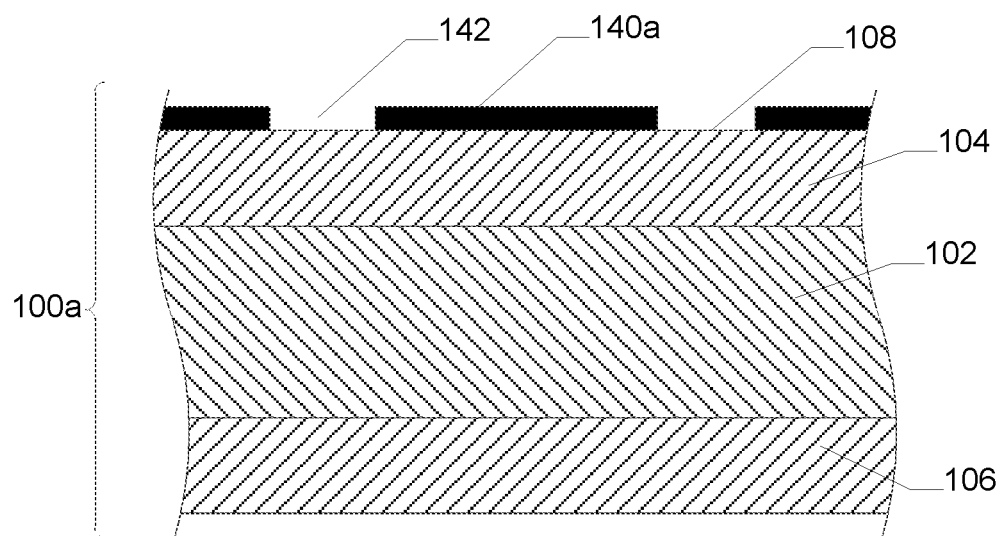
FIG. 10 is a cross-sectional schematic view of a glass laminate structure prior to forming a waveguide in a surface layer thereof with a mask applied to an outer surface of the surface layer.

In some embodiments, forming the waveguide in the surface layer of the glass laminate structure comprises subjecting the glass laminate structure to a selective ion-exchange treatment to form the high refractive index region, as opposed to the low refractive index region, within the surface layer. FIG. 10 is a cross-sectional schematic view of a glass laminate structure 100a with mask 140a applied to outer surface 108 of surface layer 104. Glass laminate structure 100a is similar to glass laminate structure 100, except that the second glass composition of surface layer 104 and/or second surface layer 106 of glass laminate structure 100a comprises a sufficiently high concentration of refractive index decreasing ions (e.g., $Na^+$) that an ion-exchange treatment with an ion-exchange medium comprising refractive index increasing ions (e.g., $K^+$ or $Ag^+$) increases the refractive index of the surface layer and/or the second surface layer within the ion-exchanged region.

The covered portion of outer surface 108 of surface layer 104 that is covered by mask 140a corresponds to an intended pattern of low refractive index region 134, and the uncovered portion of the outer surface of the surface layer that is uncovered by the mask corresponds to the intended waveguide pattern of waveguide 130. For example, openings 142 in mask 140a comprise a shape that corresponds to an intended pattern of high refractive index region 132 of waveguide 130. In the embodiment shown in FIG. 10, openings 142 in mask 140a comprise a plurality of lines corresponding to the plurality of high refractive index channels of waveguide 130 and second waveguide 130a. In other embodiments, the openings in the mask comprise one or more dots, curves, branching channels, other suitable shapes, or combinations thereof. Mask 140a can be formed from the materials and/or using the processes described herein with respect to mask 140.

Figure 11:
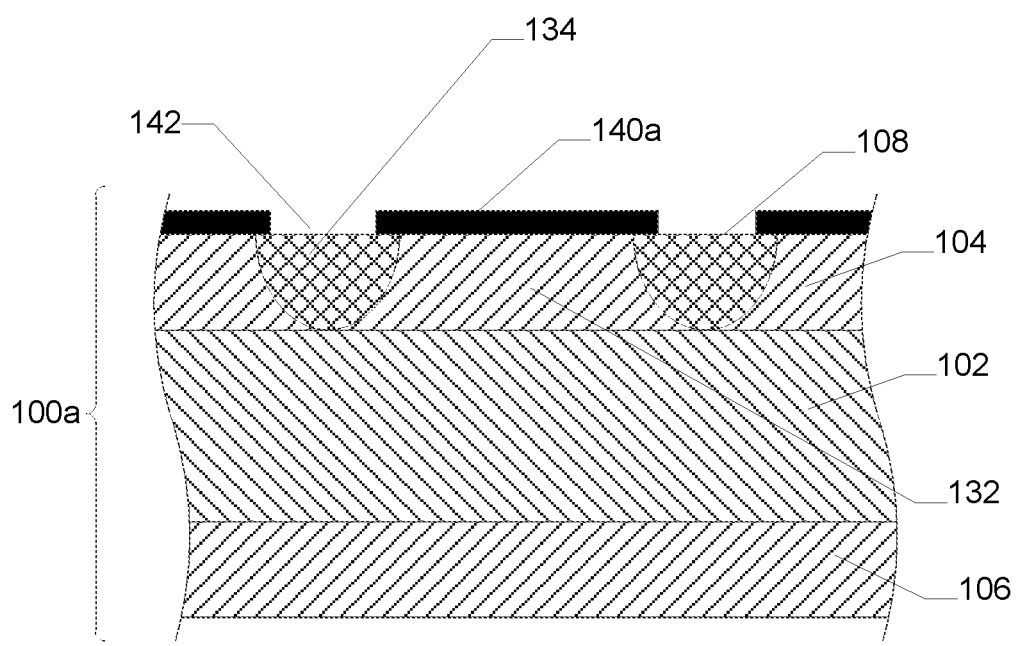
FIG. 11 is a cross-sectional schematic view of the glass laminate structure of FIG. 10 after selectively subjecting an uncovered portion of the outer surface of the surface layer to an ion-exchange treatment to form a high refractive index region of the surface layer.

Surface layer 104 of glass laminate structure 110a with mask 140a applied thereto is subjected to an ion-exchange treatment to selectively increase the refractive index in a portion of the surface layer and form high refractive index region 132 without substantially increasing the refractive index of a remaining portion of the surface layer corresponding to low refractive index region 134. FIG. 11 is a cross-sectional schematic view of glass laminate structure 100a after applying mask 140a to outer surface 108 of surface layer 104 and selectively subjecting the uncovered or exposed portion of the outer surface of the surface layer to the ion-exchange treatment. The ion-exchange medium comprises refractive index increasing ions to be exchanged with refractive index decreasing ions in the glass matrix (e.g., the glass matrix of surface layer 104). In some embodiments, the ion-exchange medium comprises a molten salt solution, and the ion-exchange treatment comprises immersing the glass laminate structure in a molten salt bath comprising refractive index increasing ions (e.g., $K^+$) to be exchanged with refractive index decreasing ions (e.g., $Na^+$) in the glass matrix of surface layer 104. In some embodiments, the molten salt bath comprises a salt (e.g., a nitrate, a sulfate, and/or a chloride) of the refractive index increasing ions. For example, the molten salt bath comprises molten $KNO_3$. Additionally, or alternatively, the temperature of the molten salt bath is from about 380° C. to about 450° C., and an immersion time is from about 2 hours to about 16 hours.

During the ion-exchange treatment, the refractive index increasing ions from the ion-exchange medium diffuse into the uncovered portion of outer surface 108 of surface layer 104 and the refractive index decreasing ions from the glass matrix diffuse out of the uncovered portion of the outer surface of the surface layer. The increased concentration of the refractive index increasing ions in the ion-exchanged region increases the refractive index of surface layer 104 in the ion-exchanged region without substantially increasing the refractive index of the surface layer in the non-ion-exchanged region.

In embodiments starting with a low refractive index glass in surface layer 104 and using ion-exchange to increase the refractive index in selected regions of the surface layer, openings 142 in mask 140a comprise a minor dimension (e.g., a width in the Y direction) less than or equal to the minor dimension of high refractive index region 134.

Base layer 102 can serve as an ion-exchange barrier that prevents ion-exchange deep into glass laminate structure 100a beyond surface layer 104 as described herein with regard to glass laminate structure 100.

The optical waveguide articles described herein can be used for a variety of applications including, for example, integrated optical or opto-electronic applications, waveguide laser sources, waveguide switches, couplers, and sensors.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. An optical waveguide article comprising:
    a base layer formed from a first glass composition with a refractive index $n_{base}$;
    a surface layer fused to the base layer and formed from a second glass composition with a refractive index $n_{surface}$; and
    a waveguide disposed within the surface layer;

wherein $n_{base}$ and $n_{surface}$ satisfy the equation $|n_{surface}-n_{base}|\geq 0.001$; and wherein the first glass composition of the base layer comprises a base coefficient of thermal expansion $CTE_{base}$, and the second glass composition of the surface layer comprises a surface coefficient of thermal expansion $CTE_{surface}$ that is less than $CTE_{base}$ such that the surface layer is under a compressive stress.

2. The optical waveguide article of claim 1, wherein:
the waveguide comprises a high refractive index region at least partially surrounded by a low refractive index region;
the high refractive index region comprises a refractive index $n_{high}$;
the low refractive index region comprises a refractive index $n_{low}$; and
$n_{high}$ and $n_{low}$ satisfy the equation $n_{high}\ n_{low} \geq 0.001$.

3. The optical waveguide article of claim 2, wherein $n_{high}$ is substantially equal to $n_{surface}$.

4. The optical waveguide article of claim 2, wherein $n_{low}$ is substantially equal to $n_{surface}$.

5. The optical waveguide article of claim 2, wherein the low refractive index region comprises an ion-exchanged region of the surface layer.

6. The optical waveguide article of claim 2, wherein the high refractive index region comprises an ion-exchanged region of the surface layer.

7. The optical waveguide article of claim 1, wherein the first glass composition comprises a base ion-exchange diffusivity $D_{base}$, and the second glass composition comprises a surface ion exchange diffusivity $D_{surface}$ that is greater than $D_{base}$.

8. The optical waveguide article of claim 7, wherein each of $D_{base}$ and $D_{surface}$ comprises an ion-exchange diffusivity with respect to a refractive index increasing ion and a refractive index decreasing ion.

9. The optical waveguide article of claim 1, further comprising a second surface layer fused to the base layer and formed from the second glass composition or a third glass composition, the base layer disposed between the surface layer and the second surface layer.

10. The optical waveguide article of claim 9, wherein a coefficient of thermal expansion (CTE) of the second glass composition or the third glass composition of the second surface layer is less than $CTE_{base}$ such that the second surface layer is under a compressive stress.

11. The optical waveguide article of claim 1, wherein the base layer and the surface layer are comprised in a laminated glass sheet.

12. An optical waveguide article comprising:
a laminated glass sheet comprising a base layer and a surface layer fused to the base layer, the base layer formed from a first glass composition with a refractive index $n_{base}$, the surface layer formed from a second glass composition with a refractive index $n_{surface}$, $n_{base}$ and $n_{surface}$ satisfying the equation $|n_{surface}-n_{base}|\geq 0.001$; and
a waveguide disposed within the surface layer, wherein the first glass composition of the base layer comprises a base coefficient of thermal expansion $CTE_{base}$, and the second glass composition of the surface layer comprises a surface coefficient of thermal expansion $CTE_{surface}$ that is different than $CTE_{base}$ such that the surface layer is under a compressive stress or a tensile stress.

13. A method of forming an optical waveguide article, the method comprising:
applying a mask to an outer surface of a surface layer of a glass laminate structure comprising a base layer fused to the surface layer, the outer surface with the mask applied thereto comprising a covered portion and an uncovered portion; and
selectively subjecting the uncovered portion of the outer surface to an ion exchange treatment to form a waveguide in the surface layer,
wherein the base layer is formed from a first glass composition with a refractive index $n_{base}$, the surface layer is formed from a second glass composition with a refractive index $n_{surface}$, and $n_{base}$ and $n_{surface}$ satisfy the equation $|n_{surface}-n_{base}|\geq 0.001$.

14. The method of claim 13, wherein one of:
(a) the covered portion corresponds to a pattern of the waveguide such that a refractive index of an ion-exchanged region of the surface layer is less than a refractive index of a non-ion-exchanged region of the surface layer; or
(b) the uncovered portion corresponds to a pattern of the waveguide such that a refractive index of an ion-exchanged region of the surface layer is greater than a refractive index of a non-ion-exchanged region of the surface layer.

15. The method of claim 13, further comprising burying the waveguide within the surface layer.

16. The method of claim 15, wherein the burying the waveguide comprises extending an ion-exchanged region of the surface layer to occupy a surface region of the surface layer such that a non-ion-exchanged region of the surface layer is separated from an outer surface of the surface layer by the ion-exchanged region.

17. The method of claim 15, wherein the burying the waveguide comprises applying a low refractive index coating layer to an outer surface of the surface layer.

18. The method of claim 13, wherein the glass laminate structure comprises a second surface layer fused to the base layer and formed from the second glass composition or a third glass composition, the base layer disposed between the surface layer and the second surface layer.

19. The optical waveguide article of claim 12, wherein:
the waveguide comprises a high refractive index region at least partially surrounded by a low refractive index region; and
one of the low refractive index region or the high refractive index region comprises an ion-exchanged region of the surface layer.

* * * * *

UNITED STATES PATENT AND TRADEMARK OFFICE
CERTIFICATE OF CORRECTION

| | | |
|---|---|---|
| PATENT NO. | : 11,307,352 B2 | Page 1 of 1 |
| APPLICATION NO. | : 16/317933 | |
| DATED | : April 19, 2022 | |
| INVENTOR(S) | : Venkata Adiseshaiah Bhagavatula et al. | |

It is certified that error appears in the above-identified patent and that said Letters Patent is hereby corrected as shown below:

On the Title Page

Item (57), in Column 2, in "Abstract", Line 13, delete "0.0001." and insert -- 0.001. --.

In the Claims

In Column 19, Line 17, in Claim 2, delete "$n_{high}\ n_{low}$" and insert -- $n_{high} - n_{low}$ --.

Signed and Sealed this
Sixteenth Day of August, 2022

Katherine Kelly Vidal
*Director of the United States Patent and Trademark Office*